Patented Aug. 31, 1943

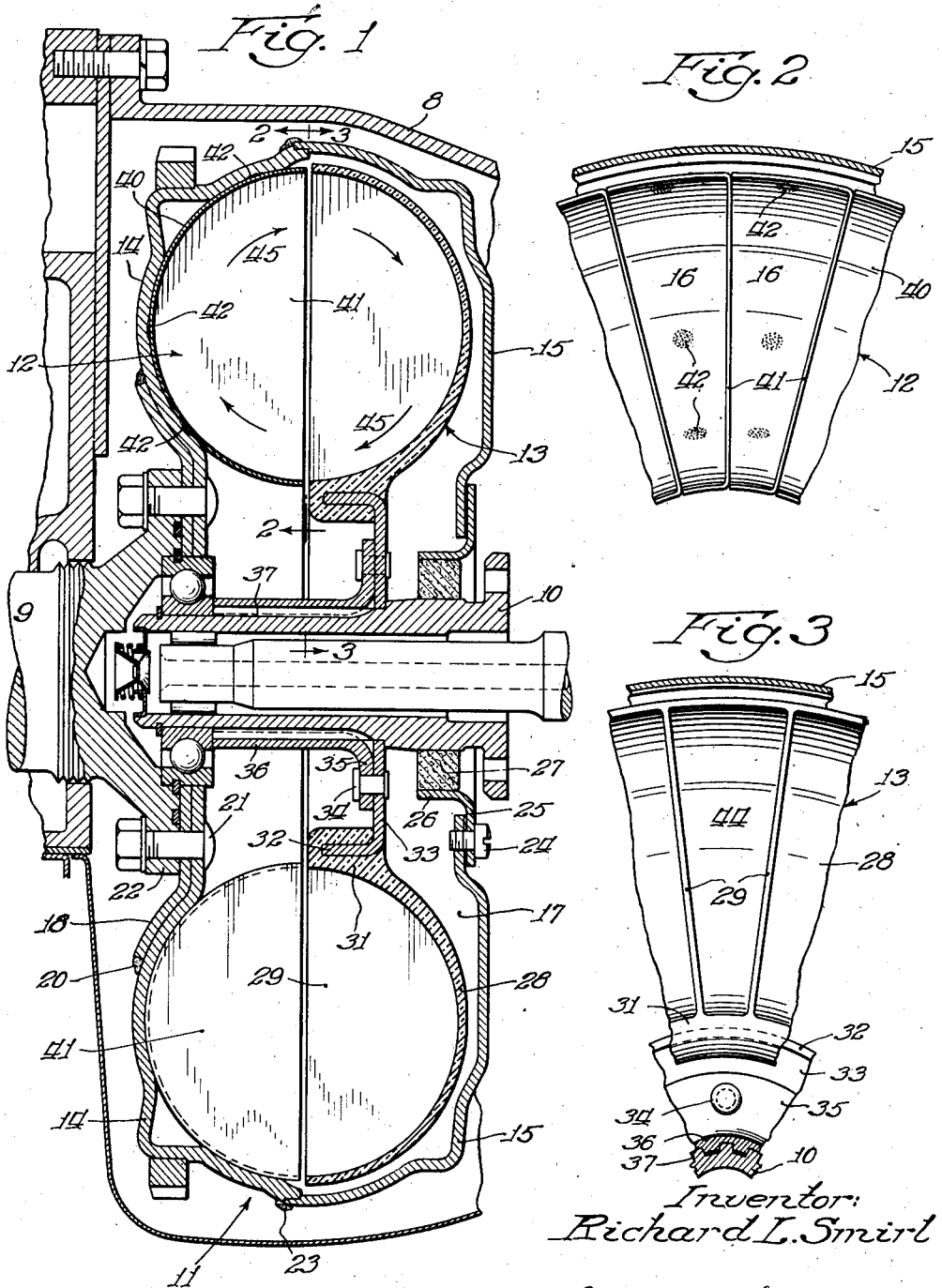

2,328,175

UNITED STATES PATENT OFFICE 2,328,175

HYDRODYNAMIC TORQUE TRANSMITTING DEVICE, WITH MOLDED PLASTIC ROTOR

Richard L. Smirl, Detroit, Mich., assignor to Borg-Warner Corporation, Chicago, Ill., a corporation of Illinois Application August 19, 1940, Serial No. 353,204

3 Claims. (Cl. 60—54)

This invention relates to hydrodynamic torque transmitting devices for motor vehicles and the like. Hydrodynamic power transmitting devices of the Föttinger type are comprised of a vaned driving element, a vaned driven element and, if torque multiplication is desired, a vaned stationary element all included in a toroidal housing. The vanes may be flat and radially disposed as in a simple coupling, or they may be intricately shaped as in the torque multiplying device. In either case, each element must be perfectly balanced to avoid vibration and undue bearing loads, and in addition, must be smooth and free of sharp corners and pockets to avoid the creation of eddy currents which adversely affect the efficiency of the device.

It has been proposed to make hydrodynamic couplings from sheet metal by forming a half-toroidal shell and then welding in stamped or formed vanes. This method presents serious welding problems, and a coupling so constructed is certain to have sharp corners which impair its efficiency. In addition, the specific weight of steel is so high that large stresses are set up in the shell as a result of centrifugal force. It is readily apparent that to form, assemble and balance a sheet metal coupling properly entails considerable expense.

The general object of this invention is to provide a hydrodynamic device which combines increased efficiency of performance with diminished manufacturing cost.

In general, these objects are attained by forming at least one of the vaned rotor members of the device with the vaned portion thereof in the form of a single integral annulus of molded plastic material having smooth burnished surfaces devoid of any projections, against which maximum efficiency of fluid action may be obtained.

In order to provide adequate torsional strength at the hub, the rotor is provided with a metallic hub the cost of which is maintained at a minimum by stamping it from heavy sheet metal. The torus portion of the rotor is molded upon an axially extended rim flange of the hub which supports the adjacent region of the torus against rupture under the effect of centrifugal force.

It has previously been proposed to form the rotors of small fluid pumps of molded plastic material, molded upon a metallic spider which is substantially coextensive with the rotor, so that the plastic need not be self supporting. The problem of rupture of the rotor under the effect of centrifugal force combined with the resistance of the fluid being acted upon, has been recognized as a major one, and it has been previously thought that an unsupported rotor of molded plastic material would not be sufficiently strong for the intended purpose.

In a hydrodynamic torque transmitting device such as a fluid coupling, the problem is greatly magnified owing to the large diameter of the rotor which is necessary to the transmission of ample power. The present invention involves the conception that in a fluid coupling, a rotor, strong enough to resist rupture under centrifugal force as long as it is operating in a body of fluid, may be made of molded plastic material so as to embody the advantages of increased efficiency of fluid action, without the use of reenforcing except at its inner extremity and, to this end, has as one of its objects to provide a rotor which is constructed of material having a specific gravity near that of the fluid in which it operates.

Other objects, the advantages and uses of the invention will become more apparent after reading the following specification and claims, and after consideration of the drawing forming a part of the specification, wherein:

Fig. 1 is an axial sectional view of a portion of a transmission embodying the invention;

Fig. 2 is a detailed sectional view taken on the line 2—2 of Fig. 1; and

Fig. 3 is a detailed sectional view taken on the line 3—3 of Fig. 1.

For purposes of illustration this invention will be described with reference to a hydrodynamic coupling, it being understood that the invention is applicable to hydrodynamic torque converters and other similar devices as well.

I have shown in the drawing a portion of a transmission including a housing 8, a drive shaft 9, which may be the rear extremity of an engine crank shaft, a driven shaft 10, leading to the gearing of the transmission, and a hydraulic coupling including a housing 11, one-half of which constitutes an impeller 12 and a runner 13 adapted to be driven from the impeller 12 by a suitable body of fluid, such as oil, circulated between the two.

The housing 11 may comprise two heavy sheet metal stampings 14 and 15 respectively, the stamping 14 carrying the impeller pockets 16 and the stamping 15 forming, together with the impeller 12, an annular chamber 17, in which the runner 13 is received. The stamping 14 may be reenforced in its inner region by a ring 18 welded thereto as at 20, and is secured as by bolts 21 to the flange 22 of the driving shaft 9. The stamping 15 is welded as at 23 to the periphery of the stamping 14 and has secured to its inner region as by means of screws 24 a ring 25 having an axial flange 26 which cooperates with a packing ring 27 for sealing the chamber 17 around the shaft 10.

The runner 13 comprises a toroidal wall 28, substantially semicircular in cross section, and is formed with integral radial vanes 29 radially bridging the space defined within the wall 28 at circumferentially spaced intervals, as shown in Fig. 3. In the molding operation, the inner surfaces of the wall 28 and vanes 29 are given a high polish, which, together with the absence of projections on such surfaces provides for a very smooth flow of fluid through the pockets 44, increasing the efficiency of the coupling. The inner region of the wall 28 is thickened as at 31. Embedded in the thickened region 31 is the rim 32 of a ring 33 which is riveted as at 34 to the flange 35 of a hub 36. The hub 36 is internally splined to receive the splined section 37 of the driven shaft 10.

The rim 32 supports the inner region 31 of the wall 28 against rupture under the effect of centrifugal force. The remainder of the wall 28 is supported against rupture by the gradual thickening of the wall toward the inner region 31 and the bridging of the inner and outer regions of the wall by the radial vanes 29.

When operating in a fluid, the centrifugal force acting against the runner may be determined by the amount of centrifugal force that would be developed by the runner operating in air, minus the centrifugal force that would be developed by a runner of the same dimensions having the same weight as the quantity of fluid that is displaced by the runner. To state it somewhat differently, the centrifugal force developed in the runner is a function of the difference between the specific gravity of the plastic material of which the runner is composed and the fluid in which it operates. Utilizing this principle, the invention makes it possible to employ a material such as a phenolic thermo-setting type of molded plastic material, for example, one of the materials sold under the trade name "Bake-Lite," "Durez," "Durite," "Indur," "Makalot," "Resinox," "Textolite," etc., where such material operating in air would tend to disintegrate under the effert of centrifugal force at the maximum speed of operation. Furthermore, I have discovered that it is possible to achieve sufficient strength in a vaned torus which is supported by reenforcing metallic structure only at its inner extremity.

The impeller 11 may be likewise formed of molded plastic material or it may be formed of stamped sheet metal as shown. The pockets in the illustrated embodiment 16 are formed of light sheet metal, stamped to provide a semi-circular wall 40 and a radial wall 41 bridging one side of the wall 40. The wall 40 is spot welded as at 42 to the wall 14 of the impeller, with the radial wall 41 of one pocket forming one side of an adjacent pocket.

The space within the housing 11 is filled with fluid, which is preferably in the form of a liquid having lubricating qualities. The fluid is impelled outwardly within the pockets 16 by centrifugal force and directed from the outer regions of the pockets across the gap between the impeller and runner and into the pockets 44 of the runner, in the outer regions thereof. Deflected radially inwardly by the toroidal wall 14 of the runner, the fluid will be discharged back into the pockets 16 of the impeller. This circulation, which is in a clockwise direction as viewed in the upper portion of Fig. 1, is indicated by the arrows 45.

It will be apparent that the smooth finish of the wall 28 and vanes 29, coupled with the absence of any irregularities or projections on the surfaces, will facilitate the flow of fluid through the pockets 44 and thereby increase the efficiency of the coupling.

Centrifugal force will maintain a substantially solid body of fluid within the shell of the coupling throughout the annular region thereof occupied by the vaned portion of the runner. As a result, the centrifugal force tending to disrupt the runner, is diminished according to the ratio of the weight of the fluid to the weight of the plastic material of which the runner is composed.

The invention provides a runner which is constructed of material such as the materials listed above, having a specific gravity less than two and one-half times that of the fluid in which it operates.

The strength of the material is ample to handle the torque load by using the sections ordinarily required for molding practice for example, the toroidal wall of the runner may be tapered from a maximum thickness at its inner extremity to a minimum thickness in its outer region in the neighborhood of not substantially greater than $1/40$ of the radial distance between the inner and outer extremities of the toroidal wall, and vanes may have a thickness not substantially more than $1/50$ of said radial distance. The buoyancy principle reduces the centrifugal stress to a very reasonable figure as shown below:

A given steel rotor (specific gravity $W=7.8$) has 30,000#/sq." (pounds per square inch) stress at 6,000 R. P. M. (revolutions per minute).

A similar phenolic rotor (specific gravity $W=1.35$) has 5,200#/sq." stress at 6,000 R. P. M.

Same phenolic rotor in oil of .9 specific gravity $(1.35-.9=.45)$ has 1,730#/sq." stress at 6,000 R. P. M.

If the steel rotor is immersed in oil $(W=7.8-.9=6.9)$, its stress is only reduced to 26,600#/sq." at 6,000 R. P. M.

While I have described my invention in connection with one specific embodiment thereof, it is to be understood that this is by way of illustration and not by way of limitation, and the scope of my invention is defined solely by the appended claims.

I claim:

1. In a hydrodynamic power transmitting device, a housing, fluid therein, a runner operating in said fluid, said runner being integrally formed of a molded plastic material having a specific gravity less than 2½ times the specific gravity of the fluid, said runner including a toroidal wall of arcuate cross section tapering from maximum thickness at its inner extremity to minimum thickness in its outer region, said minimum thickness being in the neighborhood of not substantially greater than $1/40$ of the radial distance between the inner and outer extremities of said toroidal wall portion, and vanes extending between said inner and outer wall portions and integrally joined to said toroidal wall portion, said vanes having a thickness not substantially more than $1/50$ of said radial distance.

2. A hydrodynamic power transmitting device comprising a driving housing, a vaned impeller connected to the housing and adapted to be driven thereby, said housing taking the stresses produced in the impeller by reason of the rotation thereof, a rotor adapted to be rotated from the impeller, said rotor receiving no direct reinforcement against centrifugally produced stresses on the housing, and fluid substantially filling the housing so as to submerge the greater portion of the rotor, said rotor being made of a material having a specific gravity less than two and one-half times the specific gravity of the fluid, said rotor including a toroidal wall of arcuate cross section tapering in thickness from its inner to its outer extremity, having a thickness in its outer region of not substantially more than $1/40$ of the radial distance between its inner and outer extremities, and including vanes extending from its outer to its inner extremity and integrally joined to said toroidal wall, said vanes having a thickness not substantially greater than $1/50$ of said radial distance.

3. A hydrodynamic power transmitting device comprising a driving housing, a vaned impeller connected to the housing and adapted to be driven thereby, said housing taking the stresses produced in the impeller by reason of the rotation thereof, a runner adapted to be rotated from the impeller, said runner receiving no reinforcement against centrifugally produced stresses in the housing, and fluid substantially filling the housing so as to submerge the greater portion of the runner, said runner being made of a material having a specific gravity less than $2\frac{1}{2}$ times the specific gravity of the fluid and including a toroidal wall of arcuate cross section tapering from maximum thickness at its inner extremity to minimum thickness in its outer region, said minimum thickness being in the neighborhood of not substantially greater than $1/40$ of the radial distance between the inner and outer extremities of said toroidal wall portion, and vanes extending between said inner and outer wall portions and integrally joined to said toroidal wall portion, said vanes having a thickness not substantially more than $1/50$ of said radial distance.

RICHARD L. SMIRL.